United States Patent [19]

Varga et al.

[11] 4,275,594
[45] Jun. 30, 1981

[54] WORKPIECE CLAMPING DEVICE

[75] Inventors: Gábor Varga; Ferenc Szabó; Ferenc Sztanyik; László Vágvölgyi; Jozsef Nemeth, all of Budapest, Hungary

[73] Assignee: Csepel Müvek Hiradastechnikai Gepgyara, Budapest, Hungary

[21] Appl. No.: 33,120

[22] Filed: Apr. 24, 1979

[30] Foreign Application Priority Data

Apr. 24, 1978 [HU] Hungary .............................. OE 1162

[51] Int. Cl.³ ............................................. G01M 1/02
[52] U.S. Cl. ...................................................... 73/487
[58] Field of Search .......................... 73/480, 484, 487; 301/9 CN, 9 DH; 269/49; 144/288 A

[56] References Cited

U.S. PATENT DOCUMENTS

| | | | |
|---|---|---|---|
| 2,708,954 | 5/1955 | Schultz | 144/288 A |
| 2,925,837 | 2/1960 | Twiford | 144/288 A |
| 3,138,182 | 6/1964 | Lydle | 144/288 A |
| 4,093,311 | 6/1978 | Maus | 73/487 X |

FOREIGN PATENT DOCUMENTS 2288304  5/1976  France ........................................ 73/487

Primary Examiner—Charles A. Ruehl
Attorney, Agent, or Firm—Klein & Vibber

[57] ABSTRACT

A workpiece clamping device for the fast, central clamping of workpieces provided with holes of various number and pitch diameter and/or with a central hole, such device being adapted for the balancing of vehicle wheels. The device consists of a fixing mechanism, releasing mechanism and a clamping unit attachable to them with the workpiece. The clamping unit contains a central mandrel with a threaded end, a pressure element movable on the mandrel in an axial direction and secured against turning with respect thereto, and one or more locating elements connected to the pressure element and fitting into the hole or holes of the workpiece as well as a threaded clamping element supported by the pressure element. The fixing mechanism contains a sleeve receiving the mandrel of the clamping unit; the fixing device is provided with a selectively operated releasing mechanism. Operation of the releasing mechanism automatically disables the motor which drives the balancing mechanism.

12 Claims, 5 Drawing Figures

WORKPIECE CLAMPING DEVICE

The invention relates to a workpiece clamping device for the fast central clamping of workpieces provided with holes of various numbers, spacing, diameter, and/or with a central hole. The device is used to advantage for the balancing of the wheels of vehicles.

It is well-known that with growing use of motor vehicles, and their increasing speed, efforts aimed at increasing the travelling comfort and lifespan of the vehicles and their tires require the balancing of the wheels as accurately as possible, while economic factors require that the balancing operation be performed as fast as possible. For the process of balancing it is necessary to mount the wheels centrally onto the balancing machine. The central clamping is easily solved for wheels of identical size and type, e.g. in motor car factories with the use of single-purpose tools and auxiliary power, such as pneumatic or hydraulic power. The task is more difficult with machines made for use in repair shops, where the size and characteristics of the wheels frequently vary.

Hence, discs provided with holes are most frequently used for mounting the wheel, the matching holes of which can also be found on the wheel discs of the motor vehicles. Fastening with four, five, or six bolts is a lengthy process. The prime time of a few seconds duration spent on measuring in the modern wheel balancing machines is not in proportion with the secondary time of mounting and dismounting the wheel, which may take several minutes.

Efforts have been made to eliminate this disparity. One such effort is described, for instance, in English Pat. No. 1,189,969. In accordance with such patent, the wheel is mounted on a stand made for this purpose, or mounted onto a wheel clamping device with a separate mechanism in such a way that the two halves of the wheel clamping device are screwed together with a relatively long central thread, then the wheel is mounted together with the clamping device onto the machine. In the process of dismounting the wheel, the same operations are carried out in the reverse order. The number of necessary operations prove that even this device, regarded to be the most modern, does not meet present-day requirements either. It is not sufficiently fast, a separate stand or other mechanism, which are expensive, are used for the wheel mounting and, in addition, in the mounting and dismounting operations the heavy wheel and clamping device attached thereto must be handled. This compels the operator to exert unjustifiable extra effort in the mounting of the wheel upon and dismounting of the wheel from the machine. Because of these disadvantages, this wheel clamping device has not gained wide acceptance.

The present invention has among its objects the provision of a device whereby the described disadvantages are eliminated, and with the aid of which a workpiece of any size and type, with threaded or of central orientation, such as a vehicle wheel, which together with a tool of relatively negligible weight can be placed directly onto the balancing or other machine and can be quickly fixed or released.

The object according to the invention is attained by a device consisting of fixing mechanism, releasing mechanism, and a clamping unit attachable to them with the workpiece, in which device the clamping unit contains a central mandrel with a threaded end, a pressure element movable on the mandrel in an axial direction and secured against turning, and one or several locating elements connected to the pressure element and fitting into the hole or holes of the workpiece as well as a threaded clamping element supported by the pressure element. The fixing mechanism contains a sleeve receiving the mandrel of the clamping unit and the fixing device connected with a releasing mechanism, as well as the disc supporting the workpiece.

The fixing mechanism may be a ratchet-type fixing device, or at least a device containing a wedge piece.

The locating elements are either fixed on the pressure element or are arranged on adjustable arms. The device may also be provided with a pressure element which is machined as a central cone and made integral with the pressure element.

The device according to the invention is universally applicable and is operable quickly without the use of auxiliary power. The device can be placed into the balancing machine together with the workpiece by a single movement, while the central fixing of the workpiece is carried out very quickly. The device is suitable for clamping the workpiece in the traditional way with bolts as well.

Further details of the invention are described by way of preferred examples thereof shown in the accompanying drawings, in which.

In the drawings, the same reference characters are employed to designate similar elements throughout the several views.

Figure 1:
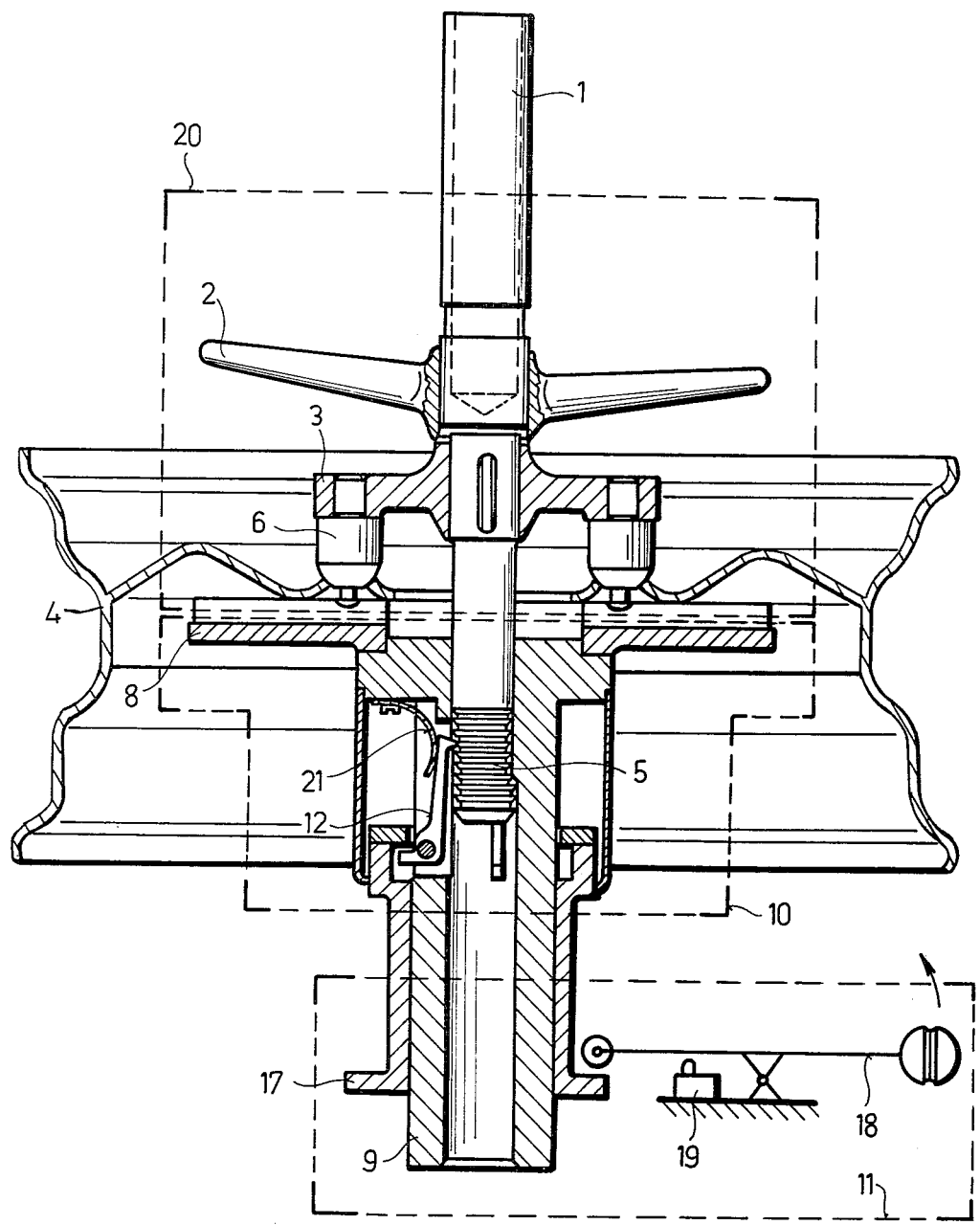
FIG. 1 is a view in longitudinal section through a first embodiment of the device according to the invention, such device containing a ratchet-type fixing mechanism.

The devices shown in the drawings consist of a clamping unit 20, fixing mechanism 10 and releasing mechanism 11.

Clamping unit 20 contains a threaded central mandrel 1 on one of its ends, a clamping element being screwed on the mandrel. The clamping element in the embodiments shown is formed as a wing nut 2. The wing nut bears upon a pressure element 3. The pressure element 3 is fitted onto the central mandrel 1 and is movable on it in an axial direction while being secured against turning with respect thereto.

In the embodiment of FIG. 1, the pressure element 3 is provided with locating elements formed as pins 6, for clamping and locating the workpiece 4, here shown as a vehicle wheel. The number of pins 6 on pressure element 3 and their location and spacing are formed according to the holes of the workpiece to be balanced. Thus a number of pressure elements 3 having various numbers and spacings of pins 6 provided may be for use with the different workpieces to be balanced.

The fixing mechanism 10 shown in FIG. 1 is connected to a sleeve 9 fitted onto the main shaft of the machine. An interchangeable disc 8 supporting the workpiece 4 is fixed to sleeve 9. The central mandrel 1 of the clamping unit 20 fits into the central passage of sleeve 9. The end of central mandrel 1 is provided with serrations or teeth 5 in contact with ratchets 12 which are turnably mounted on sleeve 9. Ratchets 12 are thrust toward teeth 5 by springs 21. The central mandrel 1 after its insertion into the passage sleeve 9, is held fixed by the fixing mechanism 10 until the releasing mechanism 11 comes into action. The fixing mechanism 10 permits the insertion of central mandrel 1, but it prevents its being pulled out in any position. Releasing mechanism 11 ensures the removal of central mandrel 1 and with it clamping unit 20 from the fixing mechanism 10. With the aid of an arm 18 a bushing 17 movable on sleeve 9 lifts the ratchets 12 out of engagement with the teeth 5 of central mandrel 1. Upon counter-clockwise movement of the arm 18, switch 19 is opened to deenergize an electric motor (not shown) which rotates the main spindle of the device.

Figure 2:
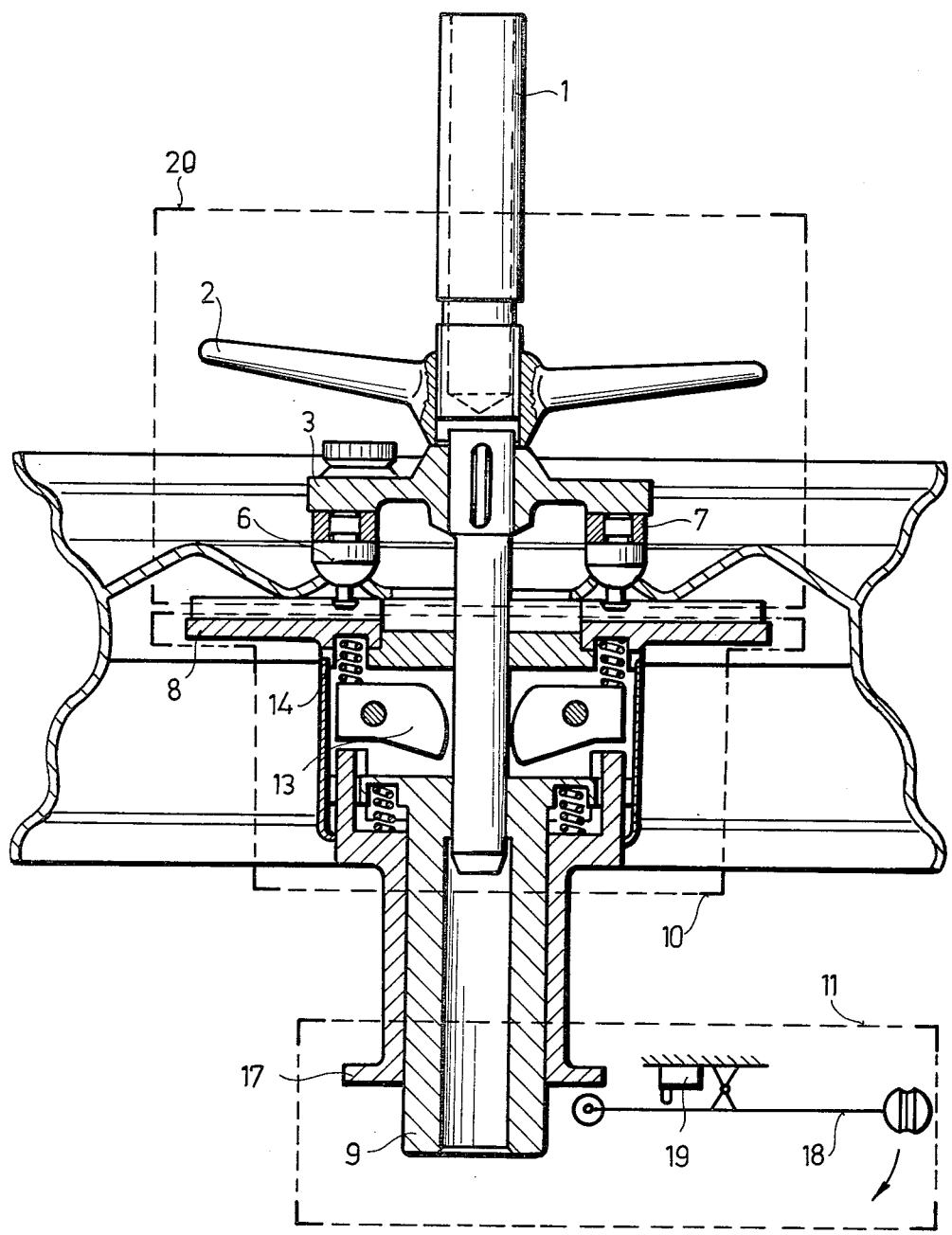
FIG. 2 is a similar view of a second embodiment of the device, in such device the fixing mechanism containing wedge segments.

In the embodiment of FIG. 2 the pressure element 3 is provided with adjustable arms 7. Pins 6 are arranged on arms 7. The free end of each pin 6 is of dome shape in order to fit into holes having various cone angles; beyond the dome they are provided with a headed cylindrical part of smaller diameter in order to prevent the workpiece from falling off the pins 6 in the course of mounting and dismounting the workpiece. The positions of the pins 6 can be set and fixed with the movement of set screws (not shown) on arms 7.

The fixing mechanism 10 in this embodiment contains wedge segments 13 supported by springs 14, the segments being released by bushing 17 moving against the thrust of springs. The wedge segments 13 are clamped to the cylindrical part of the central mandrel 1 by the springs 14. Insertion of central mandrel 1 into the central hole of sleeve 9 is permitted by the wedge segments 13, but its unwanted removal is prevented by the wedge effect. The central mandrel 1 may be pulled out after actuation of the releasing device 11 by rotating the arm 18 clockwise.

Figure 3:
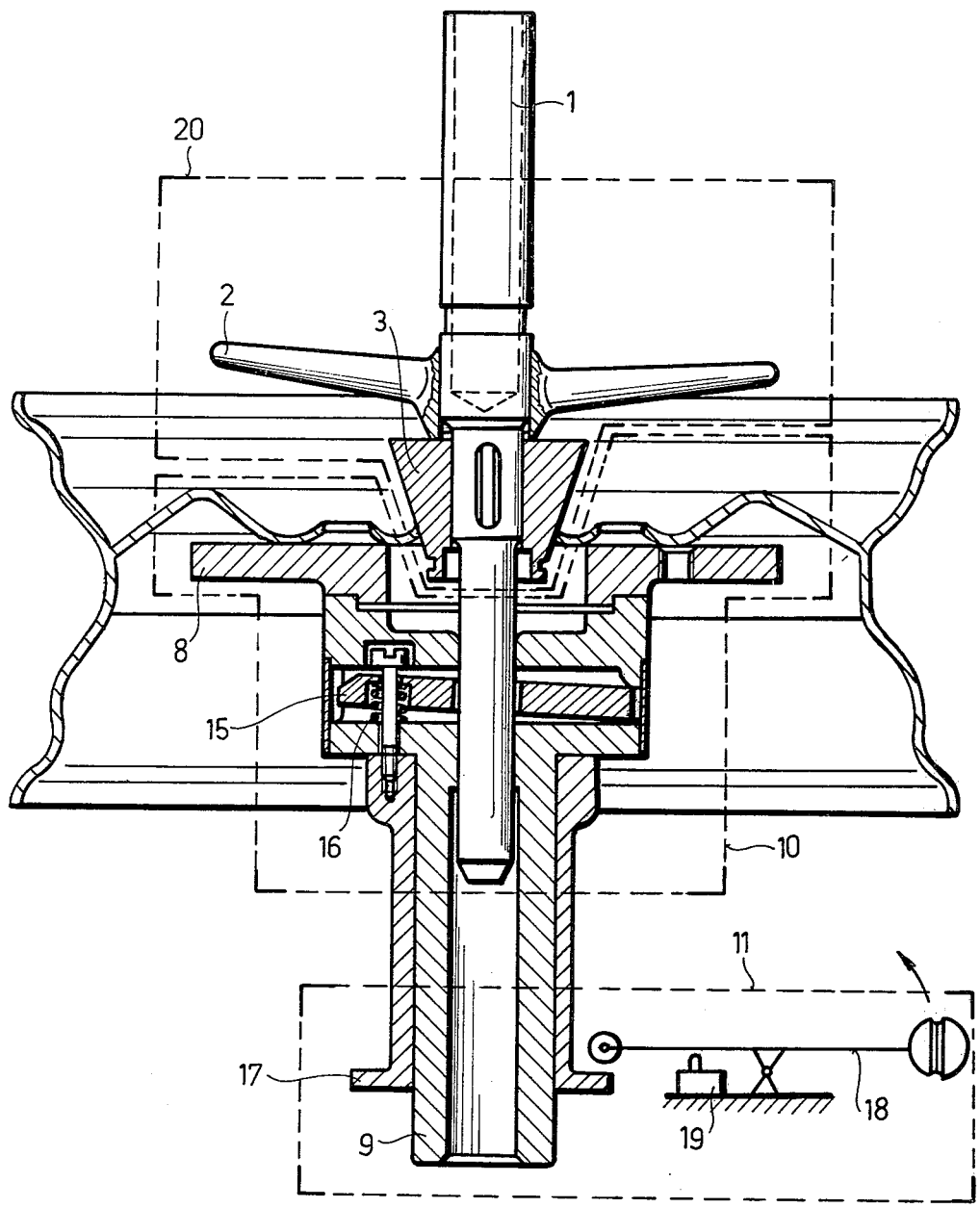
FIG. 3 is a similar view of a third embodiment of the device according to the invention, in such device the fixing mechanism containing a wedge piece formed as a plate provided with holes.

In the embodiment of FIG. 3 separate pins are not used; the pressure element 3 of frusto-conical mantle also functioning as a locating element at the same time. This device is useful when the workpiece 4 has only a central hole.

In the embodiment of FIG. 3, the fixing mechanism 10 contains a tiltable wedge piece provided with a hole and supported at a point outside the axis of sleeve 9. The wedge piece is a plate 15 with a hole into which the central mandrel 1 can be inserted, but when it is attempted to pull out the mandrel the plate 15 becomes wedged against it to prevent withdrawal of the mandrel. The wedging action is aided by coil compression spring 16 which constantly urges the plate 15 towards its tilted position. The central mandrel 1 may be removed after releasing the plate 15 from its wedged-in or tilted condition. The releasing mechanism 11 is the same as that employed in the embodiment of FIG. 1, and acts in the same manner. It permits removal of the central mandrel 1 from the central hole of sleeve 9 by releasing the wedge plate 15 to eliminate the wedging action thereof.

The advantages of the device of the invention will now be apparent. A pressure element 3 corresponding to the diameter and number of the holes of the workpiece 4 to be balanced is mounted onto the central mandrel 1. This is followed by fitting the dome-shaped end surfaces of the pins 6 into the holes of workpiece 4 to be balanced. Holding the workpiece 4 in one hand and the central mandrel 1 in the other hand, the cylindrical end of the central mandrel 1 is pushed into the guiding hole of sleeve 9 until the central part of the workpiece 4 to be balanced bears on the interchangeable disc 8. The fixing mechanism 10 permits the pushing of central mandrel 1 into sleeve 9, but is prevents its removal. For the final fixing of the workpiece to be balanced the pressure element 3 can be tightened with the wing nut 2 by about a half turn to the required extent. The central mounting of the workpiece is now completed, and the rotation or balancing of the workpiece may be carried out.

The workpiece 4 is dismounted in the following manner: After rotation of the workpiece 4 has ceased, the wing nut 2 is loosened by about a half turn, then the fixing mechanism 10 is released by moving the arm 18 in the direction of the arrow. At this stage, the workpiece 4 with the clamping unit 20 is removable. After dismounting of the workpiece 4 has been completed, the mounting of the next workpiece may begin.

Switch 19 in the releasing mechanism 11 prevents rotation of the main spindle upon actuation of the releasing mechanism.

Most of the workpieces, including vehicle wheels, are provided with a central hole. However, some workpieces, or vehicle wheels are not provided with a central hole. These are clamped in the traditional way through bolts passing through the holes in the wheel into threaded holes (not shown) in the supporting disc 8.

The construction and handling of the workpiece device make its special advantages obvious. The most important advantages are as follows:

the mounting and dismounting of the workpiece is very fast taking no more than a few seconds;

no outside power source is needed for the mounting and dismounting of the workpiece, since it is done by handpower which does not demand more effort from the operator than the tightening and releasing of a single nut by about a half turn;

in the mounting and dismounting of a workpiece hardly more than the weight of the workpieces has to be lifted, because the weight of the device does not substantially increase the total weight to be lifted;

the workpiece clamping device ensures the proper centering of the workpiece;

the workpiece clamping device is capable of universal use;

the workpiece clamping device consists of simple and inexpensive elements, but their efficient connection results in surprisingly fast and sure operation.

The device of the present invention has been described and shown as clamping motor vehicle wheels onto a wheel balancing machine. However, the invention is not restricted to the clamping of vehicle wheels, but it is suitable for the central clamping of every kind of disc-type revolving component part, wherein the fast changing of the parts is essential. Furthermore, the invention is not restricted to use with balancing machines, but it extends to such fields of application where various revolving component parts have to be clamped centrally and changed quickly, e.g. rotating test benches, machine tolls, etc.

Although the invention is illustrated and described with reference to a plurality of preferred embodiments thereof, it is to be expressly understood that it is in no way limited to the disclosure of such a plurality of preferred embodiments, but is capable of numerous modifications within the scope of the appended claims.

What is claimed is:

1. In a wheel balancing apparatus, a wheel clamping device for the fast, central clamping of wheels provided with holes of various numbers and pitch diameter and- /or with a central hole, said device comprising a disc supporting the wheel, a support including a fixing mechanism, a releasing mechanism, and a connectable clamping unit including the wheel, the clamping unit including a threaded central mandrel, a pressure element moveable in an axial direction on the central mandrel and secured against turning with a respect thereto, at least one locating element connected with the pressure element and fitting into a hole in the wheel, and a threaded clamping element screwed on the mandrel, the fixing mechanism having a sleeve receiving the central mandrel of the clamping unit, the fixing mechanism being connected with the releasing mechanism as well as the disc supporting the wheel.

2. The device as claimed in claim 1, wherein the fixing mechanism includes a releasable ratchet-mechanism.

3. The device as claimed in claim 2, wherein the ratchet-mechanism comprises teeth on the central mandrel and a spring biased ratchet detent mounted on the sleeve.

4. The device as claimed in claim 1, wherein the fixing mechanism comprises at least one wedging element mounted on the sleeve.

5. The device as claimed in claim 4, wherein the wedging element is a plate with a hole through which the central mandrel passes, the plate being tiltable from a plane perpendicular to the axis of the central mandrel.

6. The device as claimed in claim 4, wherein the wedging element is a spring biased wedge segment which oscillates radially.

7. The device as claimed in claim 1, wherein the locating element is arranged on an arm of the pressure element.

8. The device as claimed in claim 1, wherein the locating element is a pin.

9. The device as claimed in claim 1, wherein the locating element is formed as a central cone and is integral with the pressure element.

10. The device as claimed in claim 9, wherein a circular groove is provided on the locating elements to prevent the falling down of a wheel engaged with the pressure plate.

11. The device as claimed in claim 1, wherein the threaded clamping element includes a nut.

12. The device as claimed in claim 1 wherein the apparatus is a rotatable wheel balancing machine adapted to be driven by an electric motor, the releasing mechanism for releasing the fixing mechanism is provided with an actuating means, and an electric switch for disabling the motor upon actuation of the releasing mechanism by the actuating means.

* * * * *